2 Sheets—Sheet 1.

P. L. SCHMITT.

Assignor to the PEERLESS OIL EJECTOR COMPANY.

LUBRICATOR.

No. 10,780. Reissued Nov. 2, 1886.

Attest:
Walter Thacher
F. L. Middleton

Inventor
Phillip L. Schmitt
by Ellis Spear
Atty.

N. PETERS. Photo-Lithographer, Washington, D. C.

2 Sheets—Sheet 2.
P. L. SCHMITT.
Assignor to the PEERLESS OIL EJECTOR COMPANY.
LUBRICATOR.
No. 10,780. Reissued Nov. 2, 1886.
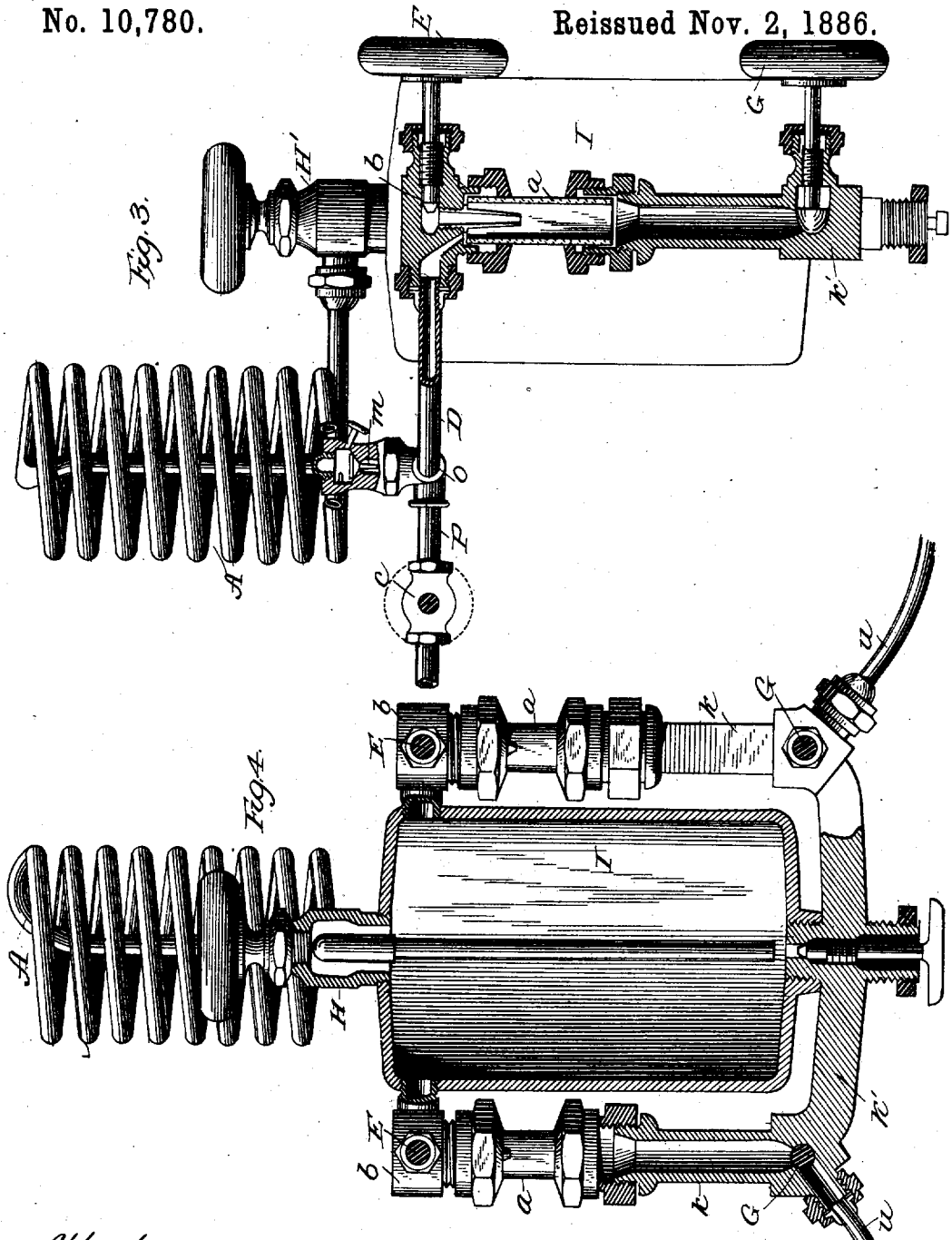
Attest:
Walter Donaldson
F. L. Middleton
Inventor
Phillip L. Schmitt
by Ellis Spear
Atty.
N. PETERS, Photo-Lithographer, Washington, D. C.

UNITED STATES PATENT OFFICE.

PHILLIP L. SCHMITT, OF QUINCY, ILLINOIS, ASSIGNOR TO THE PEERLESS OIL EJECTOR COMPANY, OF SAME PLACE.

LUBRICATOR.

SPECIFICATION forming part of Reissued Letters Patent No. 10,780, dated November 2, 1886.

Original No. 320,703, dated June 23, 1885. Application for reissue filed September 28, 1886. Serial No. 214,794.

*To all whom it may concern:*

Be it known that I, PHILLIP L. SCHMITT, of Quincy, in the county of Adams and State of Illinois, have invented a new and useful Improvement in Lubricators; and I do hereby declare that the following is a full, clear, and exact description of the same.

My invention is an improvement in lubricator-cups for locomotive-engines of that class in which the oil is fed to the working parts by displacement caused by condensation of steam brought from the boiler, and in which the feed is caused to drop through a steam-space in a glass tube.

The invention consists of various details of construction, the object of which is to simplify the apparatus and to cause it to work more freely and certainly, and especially to fit the cup to supply the steam-chests of the locomotive.

Figure 1:
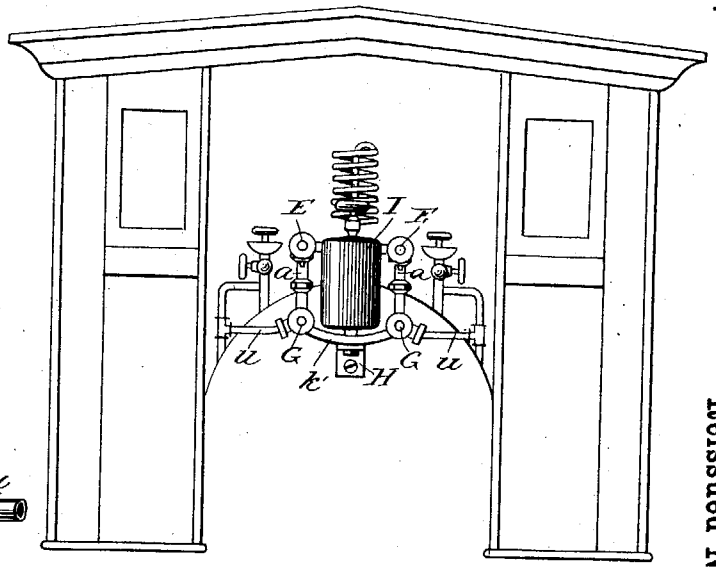
Figure 2:
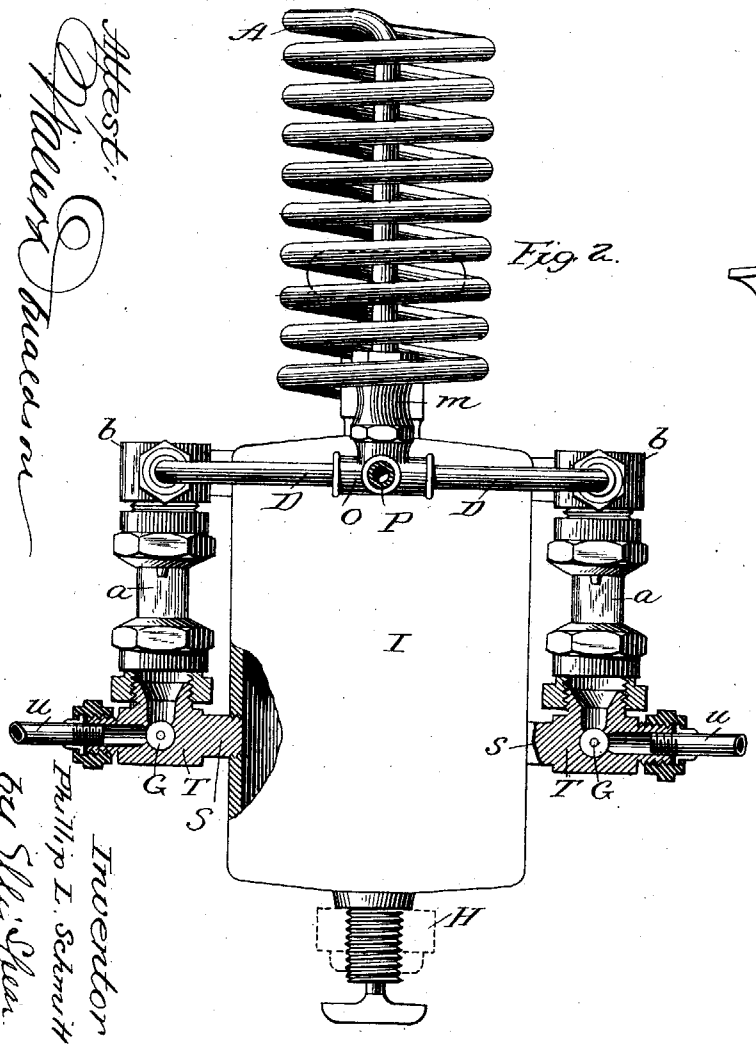

In the accompanying drawings, Figure 1 represents the cup as attached to a locomotive, being shown in front elevation. Fig. 2 is a front elevation of the cup, with a portion partly in section. Fig. 3 is a view of the modification shown in Fig. 4, with some of the parts in section. Fig. 4 is a sectional view of a modification.

In the drawings, I represents the oil-reservoir which contains the lubricating-oil. It is supported on a suitable bracket, H, which may be attached to any convenient base. On each side of the reservoir is located a sight-feed tube, *a*. These glass tubes are connected directly to the reservoir by connections between the sides thereof and the caps and lower fittings of the sight-feed tubes. At the upper end caps *b*, provided with stems cast therewith, lead into the interior of the reservoir at its upper end. At the bottom are fittings T, connected on one side by a solid coupling, S, with the sides of the reservoir. The other sides of the lower fittings are connected each to a pipe, *u*, leading to the steam-chest. From the caps *b* on each side equalizing branch pipes D are led to a four-way connection, O. These branch pipes serve to balance the pressure in the glass pipes and to promote the feed. To this connection is attached a pipe, P, in communication with the boiler. This is provided with a valve, *c*, which shuts off steam both from the reservoir and from the equalizing pipes. The connection between the pipes P and A and the pipes D is a single casting in cross form. The steam is led to the reservoir through a pipe, A, having a condensing-coil formed by coiling the pipe back upon itself. The lower end of the coil enters the top of the reservoir and extends near to the bottom. The coil itself surmounts in compact form the reservoir and forms a condensing-chamber thereon, and by its side is the filling-cap H′. Regulating-valves E E are placed in the caps *b*, and control the flow of oil to the steam-chests. Stop-valves G G are placed in the fittings T. In the fitting O, just above the junction of the pipes D with the pipe P, I provide a check-valve, *m*, which serves to prevent suction on the coil and cup when the steam is cut off from the pipes *u u*. When this occurs, no resistance is offered to the steam passing through the pipes D, and as this is the most direct route of escape no steam will pass up through the coil, but instead a vacuum will be created therein which will tend to draw the oil out of the cup through the coil. The check-valve *m* obviates this difficulty. It will be obvious, however, that this valve *m* is not absolutely essential. The whole steam-supply is obtained for the reservoir and for the equalizing-pipes through the pipe P. This furnishes the water of condensation for the displacement of the oil in the reservoir, and it also supplies steam through the reservoir and the pipes D to the upper part of the drip-tubes of the sight-feed tubes, thus equalizing the pressure in these tubes against the steam from the pipes *u* and facilitates the feed of the oil. These latter pipes *u*, with the single pipe P, are the only pipes connecting with the steam-space.

In Fig. 4 is shown another form of the cup in which the oil-reservoir is supported on a bracket, *k′*, which bracket has arms *k k*. To these arms the lower fittings of the glass tubes are fixed instead of being attached to the side of the reservoir. Whether made in this form or in the form shown in the other figures, the lubricator is compact and is easily applied to the locomotive. The sight-feed tubes have their connections with the reservoir near the upper part of the reservoir, and their lower fittings with the pipes leading to the dry-steam pipes. These sight-feed tubes are therefore filled with steam when the cup is working.

I claim as my invention—

1. A lubricator consisting of the reservoir I, a steam supply pipe connected with a condensing-coil communicating with the reservoir, sight-feed tubes on each side of the reservoir, equalizing branch pipes D, extending from the main supply-pipe P to the caps of the sight-feed tubes, and direct connections between the sight-feed tubes and the parts to be lubricated, substantially as described.

2. In combination, the oil-reservoir of the lubricating-cup, the steam-supply pipe P and its lateral branches D, the sight-feed tubes arranged upon each side of the reservoir, a condensing-coil, and the check-valve *m*, placed in the said pipe A above the junction of the branches D with the pipe P, all substantially as described.

3. In combination with the reservoir of a lubricator-cup, the pipe P, and its branches D, the pipe A, extending upward from the junction of the pipes P and D, and terminating in a coil wound downward around the said pipe A and communicating with the reservoir at the top thereof, substantially as described.

In testimony whereof I have signed my name to this specification in the presence of two subscribing witnesses.

PHILLIP L. SCHMITT.

Witnesses:
W. BARNETT,
J. D. SIGLER.